(12) United States Patent
Fischer

(10) Patent No.: US 6,947,632 B2
(45) Date of Patent: Sep. 20, 2005

(54) METHOD OF IMPLEMENTING THE KERR EFFECT IN AN INTEGRATED RING RESONATOR (THE KERR INTEGRATED OPTICAL RING FILTER) TO ACHIEVE ALL-OPTICAL WAVELENGTH SWITCHING, AS WELL AS ALL-OPTICAL TUNABLE FILTERING, ADD-AND -DROP MULTIPLEXING, SPACE SWITCHING AND OPTICAL INTENSITY MODULATION

(76) Inventor: Sylvain G. Fischer, Sindelfinger Str. 32, Boeblingen (DE), 71032

( * ) Notice: Subject to any disclaimer, the term of this patent is extended or adjusted under 35 U.S.C. 154(b) by 241 days.

(21) Appl. No.: 10/036,258

(22) Filed: Jan. 3, 2002

(65) Prior Publication Data

US 2003/0123780 A1 Jul. 3, 2003

(51) Int. Cl.[7] ............................................... G02B 6/26
(52) U.S. Cl. ............................. 385/27; 385/16; 385/32
(58) Field of Search .......................... 385/4–9, 15–17, 385/24, 27, 28, 30–32, 48

(56) References Cited

U.S. PATENT DOCUMENTS

2001/0040681 A1 * 11/2001 Paiam et al. ................. 356/480
2002/0090163 A1 * 7/2002 Lim et al. ...................... 385/15

* cited by examiner

Primary Examiner—Akm Enayet Ullah
Assistant Examiner—Michelle R. Connelly-Cushwa

(57) ABSTRACT

The present invention relates to an integrated optical ring resonator waveguide surrounded by an upper bus and a lower bus waveguide. A first resonant and intense optical wave is coupled into the upper bus whereas a second resonant optical wave is coupled into the lower bus. These resonant waves propagate from one bus to the other through the resonator in opposite directions. The first wave modulates the core refractive index of the resonator (Kerr effect) and thereby shifts the resonant conditions of the resonator. This results in the amplitude modulation of the second wave at its non-resonant port. Through this process, the optical amplitude modulation pattern of the first wave is transferred to the second wave. Optical wavelength switching is achieved when the waves have different wavelengths. In alternative embodiments and methods of driving the resonator, the resonator can achieve filtered wavelength tuning, add-and-drop multiplexing, space switching and intensity modulation.

7 Claims, 6 Drawing Sheets

DIAGRAMATIC ILLUSTRATIONS

DIAGRAMATIC ILLUSTRATIONS

Figure 1:
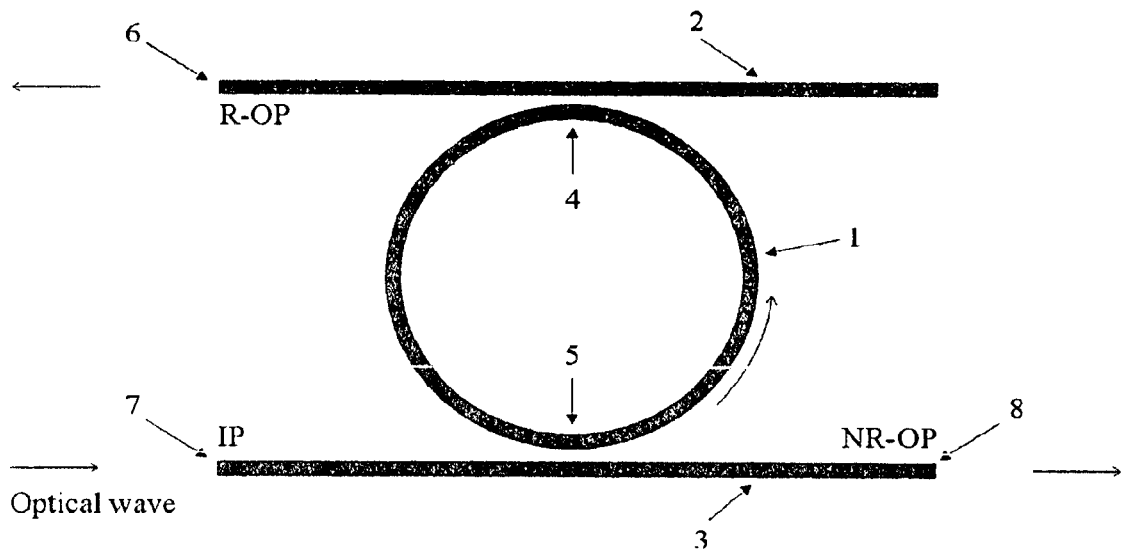

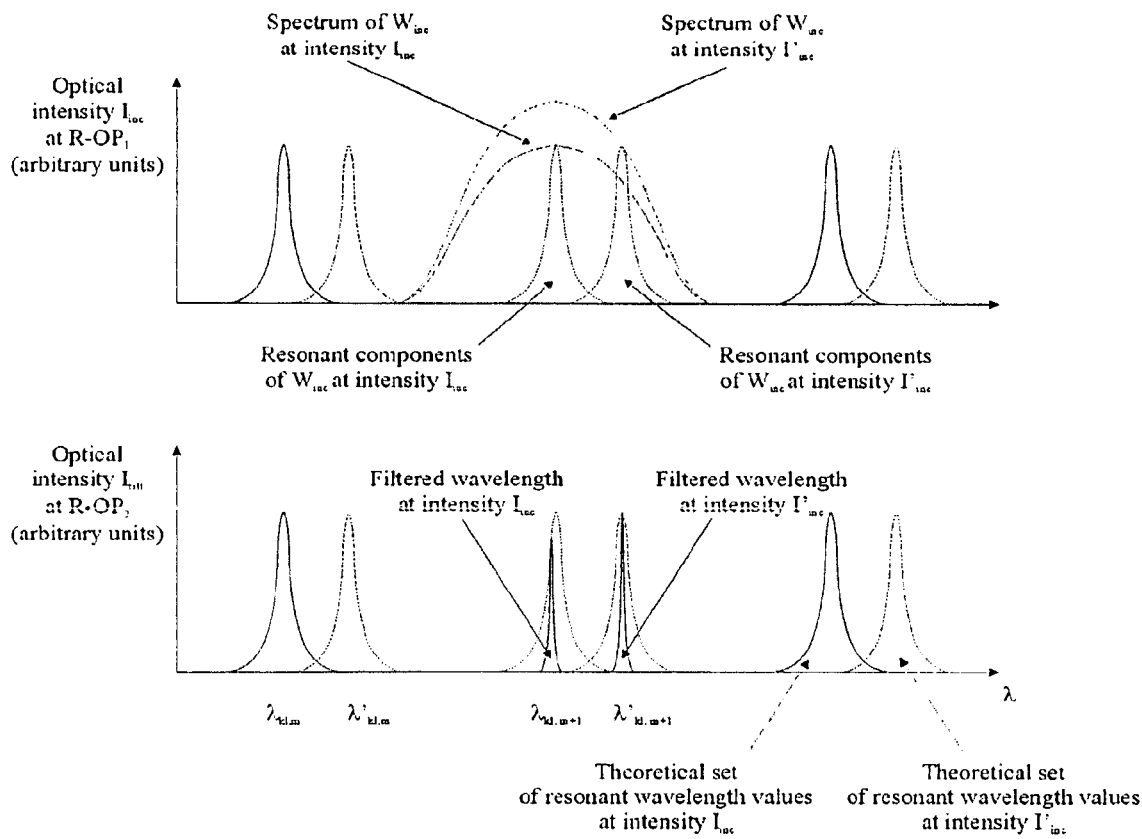
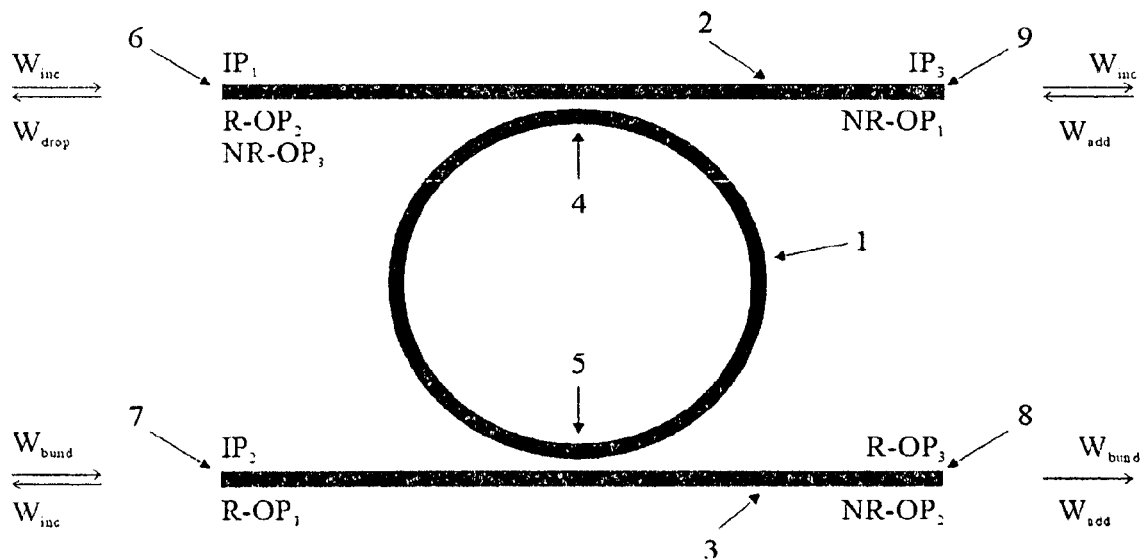
Fig. 5
Fig. 6

METHOD OF IMPLEMENTING THE KERR EFFECT IN AN INTEGRATED RING RESONATOR (THE KERR INTEGRATED OPTICAL RING FILTER) TO ACHIEVE ALL-OPTICAL WAVELENGTH SWITCHING, AS WELL AS ALL-OPTICAL TUNABLE FILTERING, ADD-AND -DROP MULTIPLEXING, SPACE SWITCHING AND OPTICAL INTENSITY MODULATION

Method of implementing the Kerr effect in an integrated ring resonator (the Kerr Integrated Optical Ring Filter) to achieve all-optical wavelength switching, as well as all-optical tunable filtering, add-and-drop multiplexing, space switching and optical intensity modulation.

CROSS-REFERENCE TO RELATED APPLICATIONS

Not Applicable

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

Optical waveguides are capable of being integrated on different kinds of substrates (e.g. glass, Gas, InP, Si) for the purpose of developing Optical Integrated Circuits (OICs). The optical waveguides can then be used to build integrated micro-devices such as attenuators, filters and multiplexers and to interconnect these devices on the same substrate. The multi-functionality achieved by the different devices in the optical chip allows for the development of advanced optical systems.

Several technological breakthroughs such as dense wavelength division multiplexing and optical amplification have allowed telecom networks to move towards operating fully within the optical layer where potential transmission speeds and capacity are greater. The operation of all-optical telecom networks ("Optical Networks") is seen as the most viable answer to managing the exponential growth in demand for bandwidth in both an efficient and economical manner.

A primary technological barrier to fully functional Optical Networks is the need for all-optical switches. Optical Networks must employ reliable all-optical switching devices, which are able to avoid the traffic bottlenecks that result with electro-optical and opto-electrical conversions implemented in most systems today. In particular, optical space switching and optical wavelength switching, also known as optical wavelength conversion, are seen as two critical features for all-optical routing/switching devices in the developing Optical Networks. Moreover, the combination of all-optical space switching with all-optical wavelength switching is necessary for the development of all-optical non-blocking telecom subsystems.

In a prior art, the non-linear optical Kerr Effect has been implemented in a Non-linear Optical Loop Mirror (NOLM) by N. J. Doran and D. Woods (Optics Letters, Vol. 13, No. 1, January 1988). The NOLM consists of an optical fiber Sagnac interferometer. A first and intense incoming signal modulates the index of refraction of the optical fiber through the Kerr effect. A second counter-propagating or co-propagating optical wave, with a different wavelength, experiences a phase shift after one round trip around the loop. This phase shift depends on the intensity of the first optical wave since this intensity modulates the refractive index of the loop. As a result, the first optical wave can induce destructive or constructive interference of the second optical wave at the output of the interferometer. Thereby, the optical intensity modulation pattern can be transferred from the first optical carrier to the second optical carrier. This all-optical wavelength conversion has been demonstrated by transferring a square modulation pattern (representing digital data) from one optical carrier to another optical carrier. However, as the strength of the Kerr effect is quite weak in a glass optical fiber ($\sim 3 \cdot 10^{-20}$ $m^2$/W, Govind P. Agrawal, Fibre-Optic Communication Systems, p. 62, second edition, Wiley-Interscience, 1997), the length of the optical loop must be very long (more than 10 km), rendering the technology of this prior art far too cumbersome for implementation in telecom or other industries requiring the use of micro-devices.

Semiconductor Optical Amplifiers (SOAs) have also been used to demonstrate wavelength conversion with a square modulation pattern (Optical Fiber Communications, Gerd Keiser, McGraw-Hill Companies, third edition, 2000, chapter 11). In this art, two SOAs are integrated in a Mach-Zender Interferometer (MZI), one SOA in each of the two arms of the MZI. The incoming optical carrier which has a wavelength $\lambda_1$, the square modulation pattern of which has to be switched to a second optical carrier which has a wavelength $\lambda_2 \neq \lambda_1$, is coupled into the interferometer, is split between both arms of the MZI and propagates along them and through the SOAs. The second optical carrier, the optical intensity of which is continuous, is coupled into the MZI in the counter-propagating direction with respect to the incoming optical carrier, is split between both arms of the MZI and propagates along them and through the SOAs as well. Because of its intensity, the incoming signal modulates the refractive index of the SOAs by depleting more or less the carrier density in the amplifying medium. This modulates the phase of the second optical carrier as it propagates through both SOAs. At the output of the MZI, the two optical waves resulting from the split of the second optical wave interfere together constructively or destructively depending on the phase shift they experienced in the MZI arms. This phase shift is defined by the square modulation pattern of the incoming optical carrier. As a result, the optical intensity of the second optical carrier is modulated in intensity according to the square modulation pattern of the incoming optical carrier. The SOAs integrated in the MZI achieve thereby wavelength conversion. Although wavelength conversion is achieved, this technique suffers from sensitivity to light polarization and wavelength chirping in the amplifying medium and, therefore, limits conversion efficiency and bandwidth.

BRIEF SUMMARY OF THE INVENTION

The present invention relates to an integrated optical ring filter, which consists of an integrated optical circuit containing a ring resonator waveguide surrounded by an upper bus waveguide and a lower bus waveguide. An optical wave, the wavelength of which meets the resonance conditions defined by the core refractive index and the length of the resonator, propagates through the resonator. This optical wave has a high intensity, therefore, it is able to modulate the core refractive index of the resonator through the Kerr effect. This refractive index change shifts the resonant conditions of the resonator. The optical wave achieves thereby the shifting of the resonance curves of the optical ring filter.

A second optical wave, the wavelength of which meets the resonance conditions of the ring resonator, propagates through the resonator in the counter-direction with respect to the first optical wave. The shifting of the resonance curves achieved by the first optical wave results in a modulation of the intensity of the second optical wave at its non-resonant port. Through this process, the optical amplitude modulation pattern of the first optical wave can be transferred to the second optical wave. When the optical waves have different resonant wavelengths, the achieved effect is optical wavelength conversion, also referred to as optical wavelength switching.

Whereas prior arts either cumulate the small phase shift induced by the Kerr effect along a large optical path or make use of the carrier density modulation in a semiconductor waveguide, the present invention stores and cumulates the energy of the incoming optical carrier along a very short path to achieve the required phase shift through the Kerr effect without making use of electrical carrier generation which is a slower process than all-optical nonlinear processes like the Kerr effect. Furthermore, the present invention implements the Kerr effect in an integrated optical ring resonator instead of a non-integrated optical fiber Sagnac interferometer. This Kerr integrated optical ring filter ("K-IORF") is, therefore, able to trigger a nonlinear effect achieving fast all-optical wavelength switching in a micro and integrated form suitable for use in the telecom industry. In addition, in alternative embodiments and methods of driving the K-IORF, the K-IORF can achieve filtered wavelength tuning, add-and-drop multiplexing, space switching and intensity modulation depending on the way it is actually driven. These features are relevant to the optical telecom industry and to other industries that make use of optical sensing, including civil engineering (monitoring), ship and aircraft industries (structural health monitoring) and automotive industry (cars, turbines).

BRIEF DESCRIPTION OF THE SEVERAL VIEWS OF THE DIAGRAMATIC ILLUSTRATIONS

FIG. 1 K-IORF top view.

Figure 2:
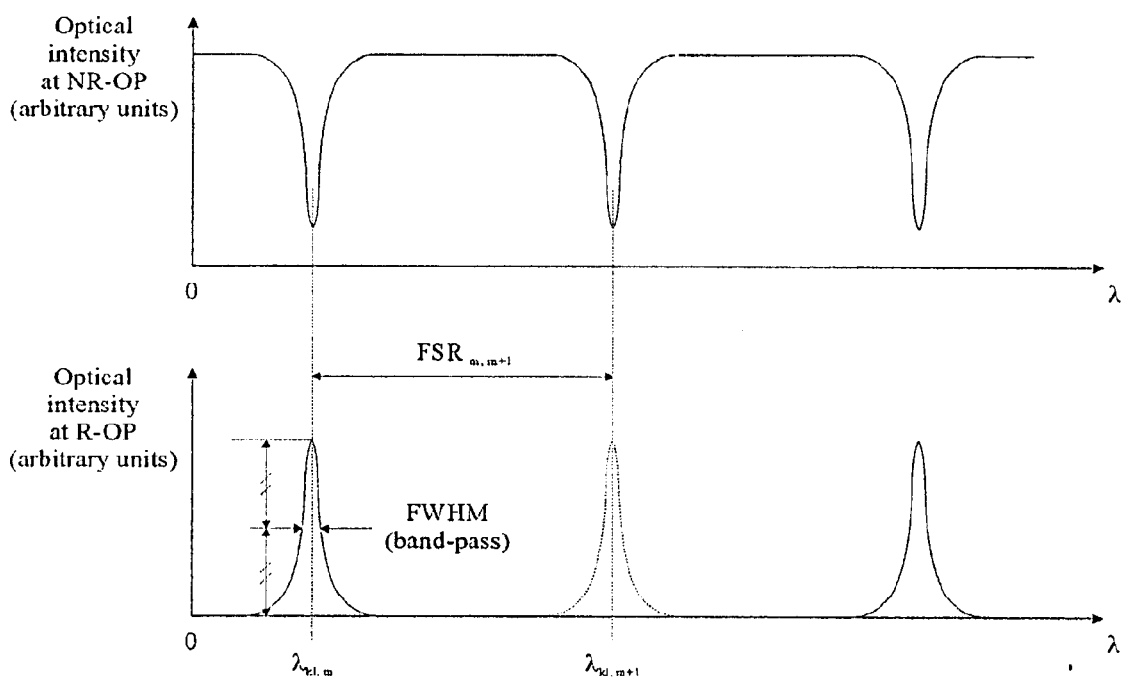

FIG. 2 Resonant curves of the ring resonator.

Figure 3:
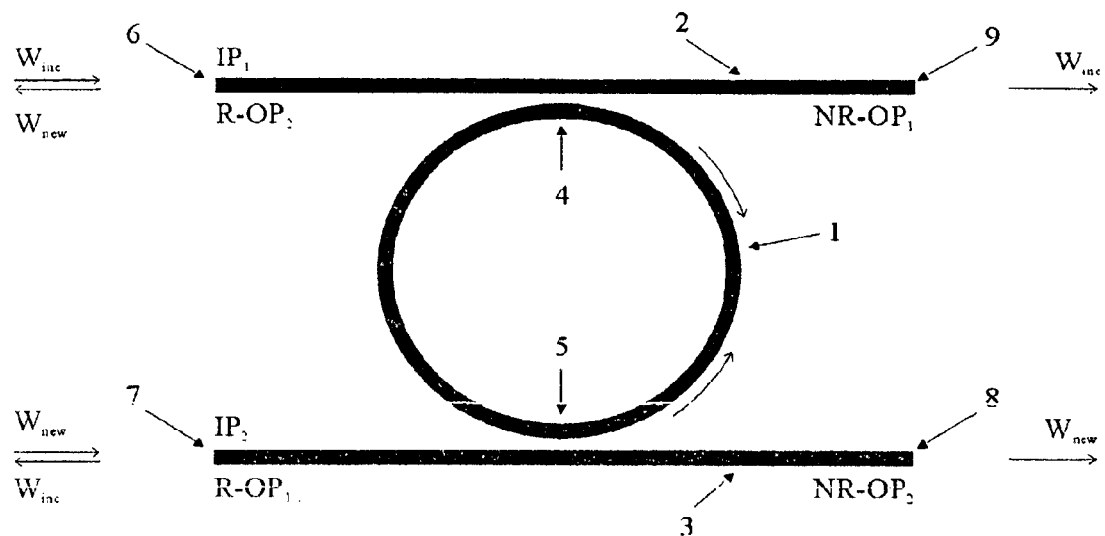

FIG. 3 K-IORF, resonance shifting and wavelength switching.

Figure 4:
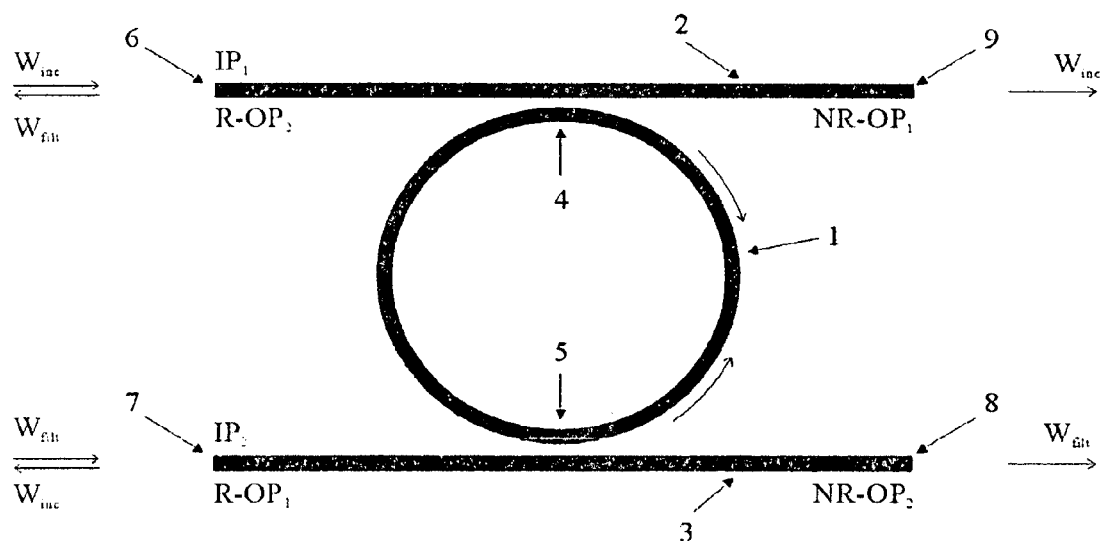

FIG. 4 K-IORF as an all-optical tunable filter.

FIG. 5 Tuning of the resonance curves of the K-IORF as an all-optical tunable filter.

FIG. 6 K-IORF as an all-optical add-and-drop multiplexer.

Figure 7:
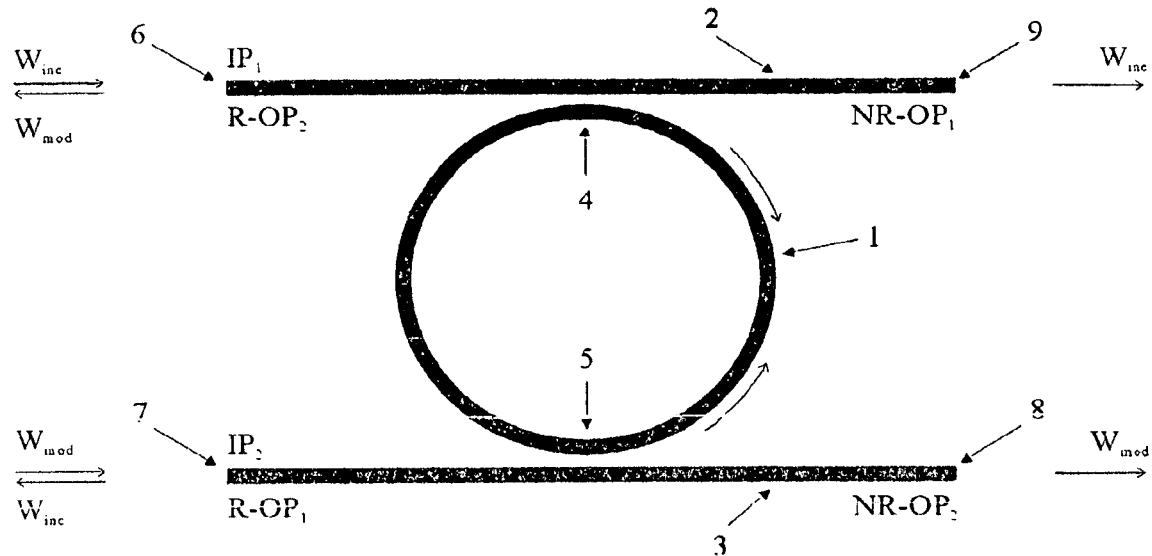

FIG. 7 K-IORF as an all-optical optical modulator.

Figure 8:
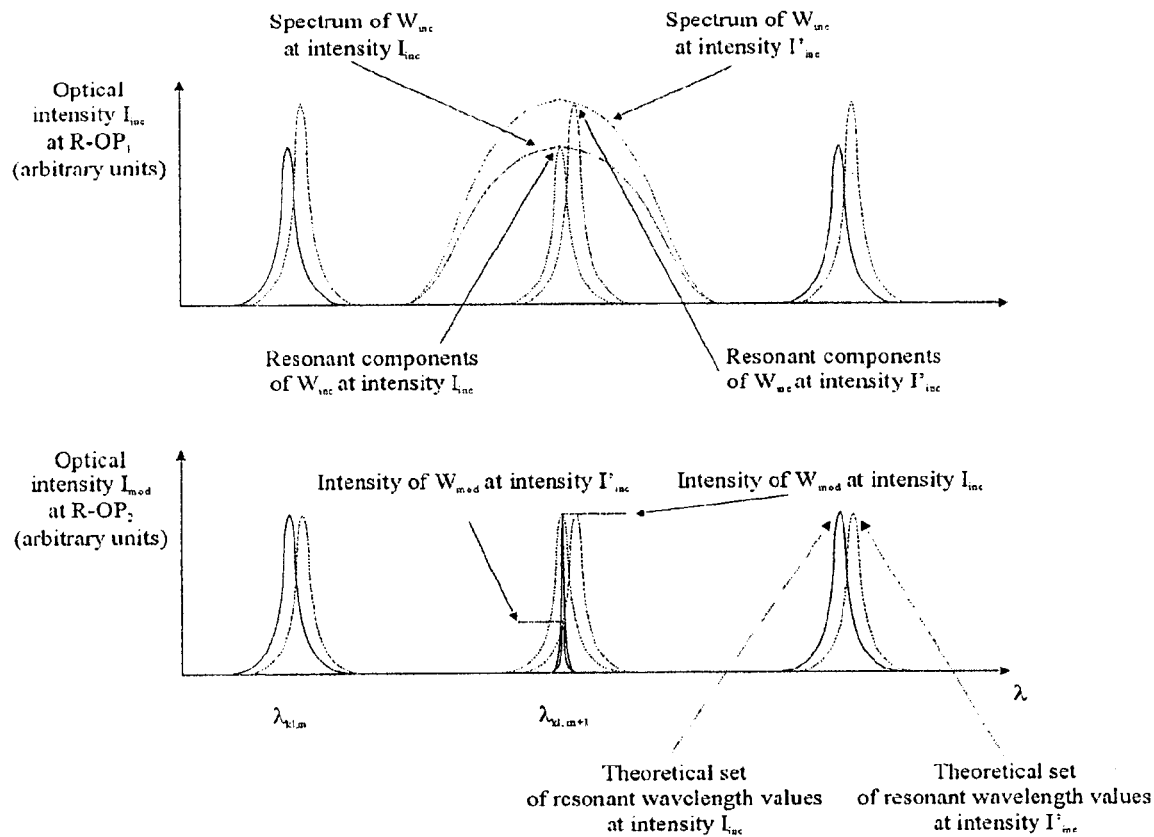

FIG. 8 Tuning of the resonance curves of the K-IORF as an all-optical optical modulator.

Figure 9:
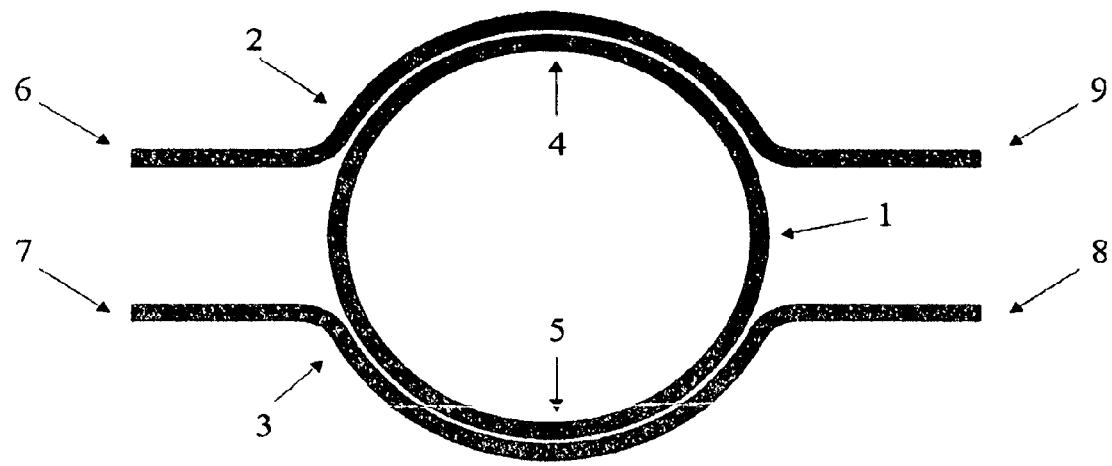

FIG. 9 K-IORF with arc-buses.

Figure 10:
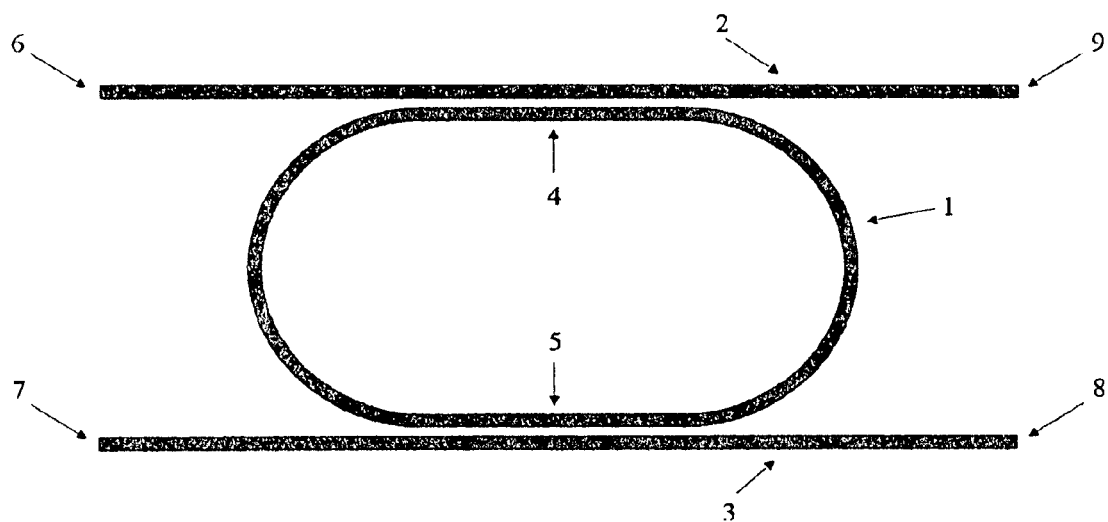

FIG. 10 Race-track K-IORF top view.

Figure 11:
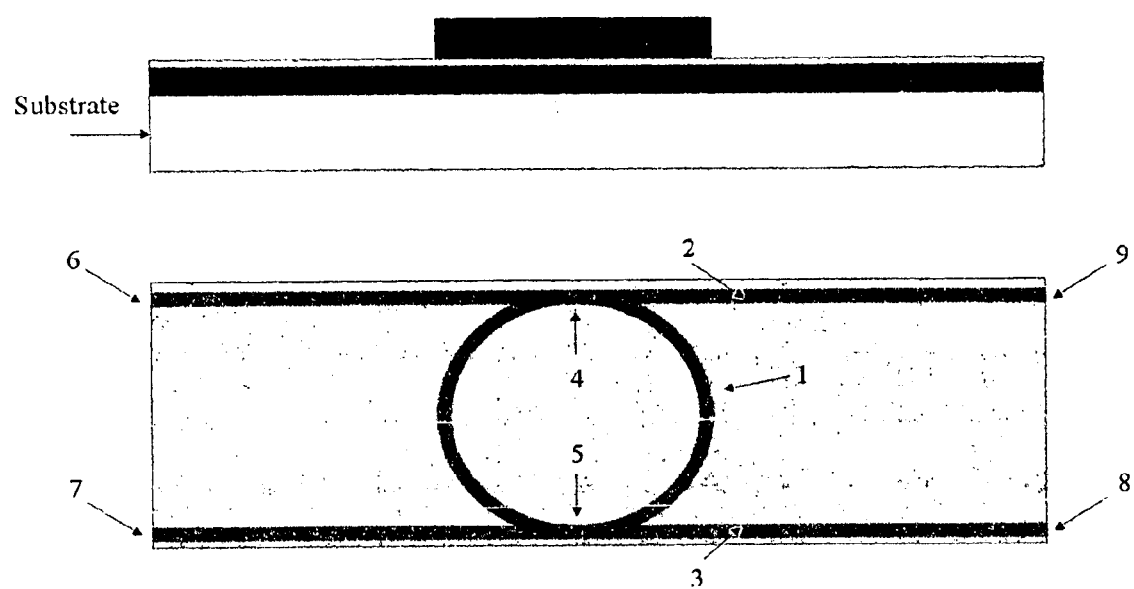

FIG. 11 Vertical coupler K-IORF.

DETAILED DESCRIPTION OF THE INVENTION

The Kerr Integrated Optical Ring Filter (K-IORF) sketched in FIG. 1 consists of:
an optical ring resonator (the "ring") (FIG. 1, 1);
an upper waveguide or upper bus waveguide (the "upper bus") (FIG. 1, 2); and
a lower waveguide or lower bus waveguide (the "lower bus") (FIG. 1, 3).

1. Manufacturing of the K-IORF.

The K-IORF can be formed in crystal layers such as $Sio_2$, SiON, GaAs, GaInAsP, Si, $LiNbO_3$. These layers are grown epitaxially (Liquid Phase Deposition, Vapor Phase Deposition, Chemical Vapor Deposition, Metal Organic Chemical Vapor. Deposition, Molecular Beam Epitaxy, etc.) on their related and appropriate substrate. The waveguides are formed by means of ionic transfer, ions implantation, ion beam etching, reactive ion etching, reactive ion beam etching, etc., depending on the nature of the crystal used (Handbook of Semiconductor Lasers and Photonic Integrated Circuits, edited by Y. Suematsu and A. R. Adams, Chapman & Hall, 1994, chapter 14 and 15; Integrated Optoelectronics, edited by M. Dagenais, R. F. Leheny and J. Crow, Academic Press, 1995, chapters 3, 4 and 6; Optoelectronics Integration: Physics, Technology and Applications, edited by O. Wada, Kluwer Academic Publisher, 1994, chapter 3 and 4; Optical Guided Waves and Devices, R. Syms and J. Cozens, McGraw-Hill Book Company, 1992, chapter 13). The different technologies for forming the waveguides have been demonstrated previously and are now mature technologies.

Although the different media mentioned above can be used to manufacture the present invention, it is beneficial to build the K-IORF with high refractive index contrast waveguides where there is a large difference between the core refractive index and the cladding refractive index (i.e the refractive index difference is larger than several percents of the core refractive index). Among other benefits, high refractive index contrast waveguides improve the level of integration due to the fact that they are less sensitive to bending optical loss and achieve stronger beam confinement in their core than low refractive index contrast waveguides (i.e. where the refractive index difference is only several percents of the core refractive index). Furthermore, the K-IORF takes advantage of the media exhibiting a stronger Kerr effect, such as the semi-conductor crystals AlGaAs (Nonlinear Refractive Index and Two-Photon Absorption near Half the Band Gap in AlGaAs, A. Villeneuve, C. C. Yang, G. I. Stegeman, C. Lin, H. Lin, Applied Physics Letters, vol. 62, n° 20, May 1993, pp. 2465–2467) and GaAsInP (Observations of an Ultrafast Nonlinear Refraction in an InGaAsP Optical Amplifer, R. S. Grant, W. Sibbett, Applied Physics Letters, vol. 58, n° 11, March 1991, pp. 1119–1121).

2. Methods to Analyze Light Propagation in the K-IORF.

There are different methods to analyze light propagation in integrated waveguides including the Beam Propagation Method (BPM), Effective Index Method (EIM), Finite Difference Time Domain (FDTD), Finite Difference Frequency Domain (FDFD), Coupled Mode Theory (CMT), the Transfer Matrix Method (TMM), the WKB Method, the Integral Equation Method (IEM), the Mode Matching Method (MMM) and the Conformal Transformation Method (CTM) (Integrated Optoelectronics, edited by M. Dagenais, R. F. Leheny and J. Crow, Academic Press, 1995, chapters 14; Optical Integrated Circuits, H. Nishihara, M. Haruna and T. Suhara, McGraw-Hill Book Company, 1988, chapter 2; FDTD Microcavity Simulations: Design and Experimental Realization of Waveguide-Coupled Single-Mode Ring and Whispering-Gallery-Mode Disk resonators, S. C. Hagness, D. Rafizadeh, S. T. Ho, A. Taflove, Journal of Lightwave Technology, vol. 15, n° 11, 1997, pp. 2154–2165; Design and Modeling of Waveguide-Coupled Single-Mode Microring Resonators, M. K. Chin, S. T. Ho, Journal of. Lightwave Technology, vol. 16, n° 8, 1998, pp. 1433–1446; J. M. Van Splunter, H. Block, N. H. G Baken, M. F. Dane, URSI Int. Symposium of Electromagnetic Theory, Budapest, 1986, p. 321; M. C. Amann, Journal of Lightwave Technology, vol. 4, 1986, p. 689; Numerical Analysis of Vectorial Wave Propagation in Waveguides with Arbitrary Refractive Index Profiles, D. Rafizadeh, S. T. Ho, Optics Communication, vol. 141, 1997, pp. 177–188; Whispering-gallery Mode Microdisk Lasers, S. L. McCall, A. F. J. Levi, R. E Slusher, S. J. Pearton, R. A. Logan, Applied Physics Letters, vol. 60, 1992, p. 289).

These methods allow for the calculation of the relevant parameters (e.g., propagation constant, transverse electromagnetic field distribution and confinement factor) of the guided modes in the waveguide. The number of guided modes and the parameters of these modes depend on the characteristics of the coupled optical waves a well as the optical and geometrical characteristics of the waveguide. In general, several modes can be guided by the structure and these modes are identified by two indices k and l: $TE_{kl}$ for transverse electric modes and $TM_{kl}$ for the transverse magnetic modes. If the characteristics of the waveguide are properly tuned, only one mode can propagate, i.e. the fundamental mode, in which case the waveguide is said to be single mode.

The computing method best suited to analyze light propagation in the waveguide depends on the nature of the waveguide structure under investigation and on the objectives of the modeling. For example, with high refractive index contrast waveguides, BPM works at its limit whereas FDTD is more accurate and efficient.

While the scope of the present invention would allow for the use of the different media available to develop Optical Integrated Circuits (OICs), the following paragraphs focus on high refractive index contrast structures as these are strongly guiding structures and are well suited for implementation of the K-IORF. Therefore, the FDTD or FDFD, the CPM and the CTM are the methods of interest to achieve the modeling of the K-IORF and will be used in the following discussion to draw its different parameters.

3. Resonance and Relevant Characteristics of the Ring Resonator.

The upper bus (FIG. 1, 2) and lower bus (FIG. 1, 3) are placed around the ring so as to be coupled to the ring and constitute two couplers: the upper coupler (FIG. 1, 4) and the lower coupler (FIG. 1, 5). Coupling occurs from the bus to the ring and from the ring to the bus through evanescent field coupling. The coupling factor K of each coupler is defined by the combination of the gap between each bus waveguide and the ring, the length along which coupling occurs (the coupling length), the optical (refractive index) and the geometrical (cross section size) characteristics of each bus and of the ring. Since the optical and geometrical characteristics of the bus and ring waveguides must be specifically chosen in order to fulfill given conditions of the optical modes propagation requirements, the gap and the interaction length are the free parameters which can be used to adjust the coupling coefficients $\kappa_{upper}$ and $\kappa_{lower}$ as necessary.

An optical wave coupled from the input port (FIG. 1, 7) of the lower bus to the ring propagates around the ring. It is partly coupled to the upper bus and partly re-coupled to the lower bus, thereby interfering with itself in the ring. It also interferes with itself at the output port (FIG. 1, 8) of the lower bus and at the output port (FIG. 1, 6) of the upper bus. The optical wave experiences a given phase shift per round trip along the ring. This shift is defined by: (i) the perimeter or length L of the ring, (ii) its index of refraction and (iii) the propagation constant β of the optical wave in the guide. When the phase shift β·L equals a multiple of 2π, the optical wave interferes constructively with itself at any point in the ring and its energy is stored in the ring. At the same time, the optical wave experiences an additional phase shift of π/2 at the couplers when it is cross-coupled from the bus to the ring or from the ring to the bus. Therefore, when β·L equals q·2π, q being an integer, the total phase shift experienced by an optical wave traveling from the lower coupler input to the lower coupler output through the ring is (2q+1) π and the optical wave interferes destructively with itself at the output port (FIG. 1, 8) of the lower bus. This port is said to be the non-resonant output port ($CNR\text{-}OP_1$) of the optical wave. Since the resonant optical wave interferes constructively with itself at any point in the ring, it also interferes constructively with itself at the upper coupler output and therefore, at the output port (FIG. 1, 6) of the upper bus which is said to be the resonant output port of the optical wave ("R-OP").

For a given perimeter of the ring, there is a theoretical set of optical wavelengths that fulfill the resonant conditions of the ring (the "resonant optical wavelengths"). An optical wave that has an optical wavelength equal to one of these resonant optical wavelengths experiences a phase shift of m 2π, m being an integer, per round trip along the ring and is resonant. The optical wave is the $m^{th}$ longitudinal mode of the resonator. As a result, the ring resonator performs as an optical ring filter. In a high refractive index contrast waveguide, the wavelengths set is given by (FDTD Microcavity Simulations: Design and Experimental Realization of Waveguide-Coupled Single-Mode Ring and Whispering-Gallery-Mode Disk resonators, S. C. Hagness, D. Rafizadeh, S. T. Ho, A. Taflove, Journal of Lightwave Technology, vol. 15, n° 11, 1997, pp. 2154–2165):

$$\lambda_{kl,m} = \frac{2 \cdot \pi \cdot R_{eff,kl} \cdot n_{eff,kl}}{m} \qquad \text{Equation 1}$$

where $n_{eff,\,kl}$ is the effective refractive index and $R_{eff,\,kl}$ the effective ring radius of the transverse mode k, l propagating in the ring and in the buses. In case of single mode propagation, the two indices k and l can be omitted for simplicity. FIG. 2 shows graphically the intensity at R-OP and NR-OP of an optical wave propagating in the K-IORF depending on its optical wavelength.

In a theoretical ideal medium where the K-IORF experiences no optical loss, if an optical wave is coupled at the input port (the "IP") (FIG. 1, 7) of the lower bus and is resonant, meaning its wavelength matches one theoretical resonant optical wavelength, the optical intensity at the lower bus NR-OP (FIG. 1, 8) falls to the smallest possible level and the optical intensity at the upper bus R-OP (FIG. 1, 6) reaches the highest possible level. In other words, the optical wave is optimally transferred from the lower bus to the upper bus. In practice, however, the optical wave experiences optical loss along the waveguides, including bending loss in the ring, scattering along the guides, loss at the coupler. Due to these optical losses, the optical intensity reaches a so-called resonant optical transmission level (the "resonant optical transmission level") at R-OP, which is lower than the initial optical intensity at IP, and falls to a so called resonant optical rejection level (the "resonant optical rejection level") at NR-OP. The better the design and the manufacturing quality of the resonator, the lower the overall optical loss. The lower the overall optical loss, the higher the resonant optical transmission level at R-OP (closer to the optical intensity at IP) and the lower the resonant optical rejection level at NR-OP.

By slightly de-tuning the wavelength of the optical wave from the value of a resonant wavelength, part of the optical intensity is then coupled at NR-OP (FIG. 1, 8) where it is no longer as low as the resonant optical rejection level and part remains coupled at R-OP (FIG. 1, 6) where it is no longer as high as the resonant optical transmission level. The optical wave is said to be almost resonant meaning that its optical wavelength no longer matches the value of a resonant wavelength of the ring but is only slightly different from it. The greater the detuning is, the higher the intensity at NR-OP (FIG. 1, 8) and the lower the intensity at R-OP (FIG. 1, 6).

The spectral distance between two contiguous resonant wavelengths of the resonator is the Free Spectral Range (FSR) of the ring. In a strongly guiding structure, the FSR is given by (FDTD Microcavity Simulations: Design and Experimental Realization of Waveguide-Coupled Single-Mode Ring and Whispering-Gallery-Mode Disk resonators. S.C. Hagness, D. Rafizadeh, S.T. Ho, A. Taflove, Journal of Lightwsvo Technology. vol. 15, n° 11, 1997. pp. 2154–2165):

$$FSR_{kl,m(m+1)} = \left[ \frac{2 \cdot \pi \cdot R_{eff,kl} \cdot n_{eff,kl}}{m+1} - \frac{2 \cdot \pi \cdot R_{eff,kl} \cdot n_{eff,kl}}{m} \right]$$ Equation 2

It can be also be given by (Vertically Coupled Glass Microring Resonator Channel Dropping Filters, B.E. Little, S.T. Chu, W. Pan, D. Ripin, T. Kaneko. Y. Kokubun, E; Ippen. IEEE Photonics Technology Letters, vol. 11, n°2, 1999, pp. 215–217):

$$FSR_{kl} = \frac{\lambda_{kl}^2}{2 \cdot \pi \cdot R_{eff,kl} \cdot n_{ef,kl}} \cdot \left[ 1 + \frac{\lambda_{kl}}{n_{eff,kl}} \cdot \frac{dn_{eff,kl}}{d\lambda_{eff,kl}} \right]^{-1}$$ Equation 3 where the last term accounts for the material dispersion as well as the waveguide dispersion, the latter being not negligible in a high refractive index contrast structure.

When the FSR is made wider than the actual spectrum of wavelengths propagating the optical system in which the ring filter is implemented, the ring can filter out only one unique wavelength at a time. If the FSR or a multiple of the FSR is made to match the spectral spacing between wavelengths propagating in the system, then these wavelengths can be resonant in the ring at the same time both in co-propagating direction or counter-propagating directions and the ring can filter these wavelengths out together.

The resonator is further characterized by its finesse F and quality factor Q as to:

$$F_{kl,m(m+1)} = \frac{FSR_{kl,m(m+1)}}{FWHM_{kl,m}}$$ Equation 4

$$Q_{kl,m} = \frac{\lambda_{kl,m}}{FWHM_{kl,m}}$$

where FWHM stands for the full width at half maximum of the resonator. The FWHM is the 3 dB band-pass of the ring filter and is mainly defined by the optical loss in the resonator, such as its coupling loss, scattering loss and bending loss. The higher the optical loss, the wider the band-pass of the ring filter and the smaller the finesse and the quality factor. In addition, the higher the optical loss, the lower the level of the optical energy confined in the resonator.

Note 1: The finesse F and the quality factor Q are also indexed since their value depends on the order of the transverse mode (k,l) and on the order of the longitudinal mode (m). In addition, the FSR decreases slowly as $\lambda$ increases. Therefore, the FSR is related to two contiguous longitudinal modes (m, m+1).

While the refractive index of a ring resonator is defined by the nature of its material, the length of the resonator can be chosen in order to define the FSR as required, within the limits of the manufacturing technology. As a result, the FSR can be adjusted to match the spacing between a targeted set of periodically spaced wavelength values, causing the K-IORF to be able to filter any optical wave, the wavelength of which matches one of the wavelength values of the targeted set. When the FSR matches the spectral spacing of the targeted set, any wavelength value of the set is a resonant wavelength of the K40RF.

Note 2: If, as a result of the dispersion mentioned in Note 1 above, the spectrum of the optical carriers in the system is too large, only a subset of the set of the resonant wavelengths of the resonator will be able to match a subset of the optical carriers spectrum and several K-IORF$_s$ would be required to fully map the spectrum.

4. Kerr Effect and Resonance Shifting.

In any optical substrate, an intense optical wave, i.e. with a large electric field, modulates the refractive index of the medium through the third order susceptibility $\chi^{(3)}$. Indeed, the polarization of the substrate not only depends linearly on the electric field but is defined as to (Nonlinear Fiber Optic., G.P. Agrawal, Quantum Electronics Principles and Applications, Academic Press, 1989, chapter 1):

$$\vec{P} = \epsilon_0 \cdot [\chi^{(1)} \cdot \vec{E} + \chi^{(2)} : \vec{E}\vec{E} + \chi^{(3)} : \vec{E}\vec{E}\vec{E}]$$ Equation 5 where $\epsilon_0$ is the dielectric constant in vacuum, $\vec{E}$ is the electric field of the optical way, ".", ":" and ":" denotes the tensor product of order 1, 2 and 3 respectively and $\chi^{(i)}$ is the tensor of susceptibility of order i of the ring material. The optical wave is considered to be intense if its optical intensity exceeds a given threshold (the Kerr threshold) above which the Kerr effect is no longer negligible, i.e. above which it is possible to detect the refractive index change that is due to, and depends directly on, the optical intensity of the wave. Below this threshold, the optical wave is said to be weak. The Kerr threshold is defined by the physical properties of the substrate.

As a result, in terms of optical intensity ($I_{opt} = |E_{opt}|^2$) the refractive index can be calculated according to (Nonlinear Fiber Optics, G. P. Agrawal, Quantum Electronics Principles and Applications, Academic Press, 1989, chapter 2):

$$n(I_{opt}) = n_L + n_{NL} \cdot I_{opt}$$ Equation 6 with:

$$n_{NL} = \frac{3}{8 \cdot n_L} \cdot \chi^{(3)}$$ Equation 7

$n_L$ being the linear refractive index of the ring and $I_{opt}$ the intensity of the optical wave. This is the well-known Kerr effect. $n_{NL}$ is typically 10–20 m$^2$/W in SiO$_2$ (Fiber-Optic Communication Systems, G. P; Agrawal, Wiley Interscience, second edition, 1997, chapter 2), 10–17 m$^2$/W in AlGaAs (Nonlinear Refractive Index and Two-Photon Absorption near Half the Band Gap in AlGaAs, A. Villeneuve, C. C. Yang, G. I. Stegeman, C. Lin, H. Lin, Applied Physics Letters, vol. 62, n° 20, May 1993, pp.

2465–2467) and up to 10–15 m²/W in GaInAsP (Observations of an Ultrafast Nonlinear Refraction in an InGaAsP Optical Amplifer, R. S. Grant, W. Sibbett, Applied Physics Letters, vol. 58, n° 11, March 1991, pp. 1119–1121).

By coupling the resonant optical wave at $IP_1$ of the upper bus (FIG. 3, 6) of the K-IORF, it propagates in the ring (FIG. 3, 1) and it is automatically coupled at $R\text{-}OP_1$ (FIG. 3, 7) of the lower bus. Because its optical wavelength matches one of the resonant wavelengths of the K-IORF, the optical intensity reaches the resonant optical transmission level in the ring (FIG. 3, 1) and is approximated as to:

$$I_{res} \approx I_{in} \cdot \frac{F}{\pi} \qquad \text{Equation 8}$$

where $I_{res}$ is the optical intensity in the resonator, $I_{in}$ is the optical intensity of the optical wave at IP1 and F is the finesse of the ring (Effect of Stimulated Brillouin Scattering on the Performance of Polarization-Maintaining All-Fiber Ring Resonators, R. Kadiwar, I. P. Giles, Optics Letters, vol. 14, n° 6, 1989, pp.332–334). The optical intensity at $R\text{-}OP_1$ (FIG. 3, 7) of the lower bus reaches the resonant optical transmission level and the optical intensity at $NR\text{-}OP_1$ (FIG. 3, 9) of the upper bus falls to the resonant optical rejection level. If $I_{in}$ is raised above a given threshold, which is defined by the Kerr threshold in the ring, $n_{NL}$ is no longer negligible. The refractive index n of the waveguide is shifted and the whole set of the resonant optical wavelengths of the K-IORF is, thereby, also shifted according to Equation 1. In other words, the intensity of the input wave achieves resonance shifting. Because the input wave has a fixed wavelength, it is no longer resonant but it becomes almost resonant and part of its intensity is coupled at $NR\text{-}OP_1$ (FIG. 3, 9) of the upper bus while the remaining intensity is coupled at $R\text{-}OP_1$ (FIG. 3, 7) of the lower bus. The intensity in the ring (FIG. 3, 1) decreases down to a working point where the resonant intensity remains high enough to maintain the refractive index shift, but can no longer increase it.

The resonance shift is the spectral distance between (x) the value of the $m^{th}$ longitudinal resonant wavelength at rest $\lambda_{kl,m\ rest}$, without any intense optical wave in the ring and thus no Kerr effect; and (y) the value of the same $m^{th}$ longitudinal resonant wavelength $\lambda_{kl,m\ Kerr}$ with an intense resonant optical wave coupled in the ring which induces the Kerr effect. The resonance shift causes the detuning of the input optical wave from the resonance point. The magnitude of detuning defines the amount of optical intensity coupled at $R\text{-}OP_1$ (FIG. 3, 7) and $NR\text{-}OP_1$ (FIG. 3, 9).

5. K-IORF and Wavelength Conversion.

An incident resonant optical wave $W_{mc}$ is coupled from $IP_1$ (FIG. 3, 6) of the upper bus through the ring (FIG. 3, 1) to $R\text{-}OP_1$ (FIG. 3, 7) of the lower bus. Another new resonant optical wave $W_{new}$ is coupled from $IP_2$ (FIG. 3, 7) of the lower bus through the ring (FIG. 3, 1) to $R\text{-}OP_2$ (FIG. 3, 6) of the upper bus. Almost no intensity of $W_{new}$ is coupled at $NR\text{-}OP_2$ (FIG. 3, 8) to the lower bus. Both optical waves have different resonant wavelengths.

The intensity of $W_{inc}$ is then increased, causing the set of resonant optical wavelengths of the K-IORF to be shifted to the working point previously defined in Section 4 above and both $W_{inc}$ and $W_{new}$ become almost resonant due to the Kerr effect arising in the ring. As a result, part of the intensity of $W_{new}$ is coupled at $NR\text{-}OP_2$ (FIG. 3, 8) of the lower bus. The intensity at this port depends upon the magnitude of the Kerr effect in the ring (FIG. 3, 1) and, therefore, upon the intensity of $W_{inc}$.

By modulating the intensity of $W_{mc}$, the magnitude of the Kerr effect in the resonator is also modulated accordingly. This results in a modulation of the intensity of $W_{new}$ at $NR\text{-}OP_2$ (FIG. 3, 8) of the lower bus. In addition, the modulation pattern of $W_{new}$ is exactly the same as the modulation pattern of $W_{mc}$, provided that the modulation rate is not smaller than the rise and fall time of the Kerr effect. The Kerr effect set up time is in the range of a few femto-seconds (Fiber-Optic Communication Systems, G. P; Agrawal, Wiley Interscience, second edition, 1997, chapter 7), therefore, modulation rates of a few nano-seconds are achievable. By transferring the modulation pattern of $W_{inc}$ to $W_{new}$ the K-IORF achieves wavelength conversion also known as wavelength switching.

An optical wave carrying binary data has a square wave modulation pattern encoding the logic '0' and the logic '1'. This bit pattern can be transferred from $W_{inc}$ to $W_{new}$ through the K-IORF at bit rates exceeding several tens of gigabit per second. The K-IORF can, therefore, achieve all-optical wavelength switching at high bit rates.

6. K-IORF as an All-Optical Tunable Filter.

As described in Section 4 above, the K-IORF is a resonance shifter. By coupling a continuous incident optical wave $W_{inc}$ with a constant intensity and a spectrum broader than the FWHM of the K-IORF at input $IP_1$ (FIG. 4, 6) instead of a modulated incident optical wave, the resonance shift is stationary. The intensity of the resonant spectral components of the spectrum of $W_{inc}$ defines the set of the resonant optical wavelengths of the resonator. By coupling an optical wave $W_{filt}$, to be filtered out by the optical ring filter and which has a wavelength equal to one of the resonant optical wavelengths of the resonator, at input port $IP_2$ (FIG. 4, 7), then $W_{filt}$ is resonant and the K-IORF couples $W_{filt}$ from $IP_2$ to its resonant output port $R\text{-}OP_2$ (FIG. 4, 6) where the intensity of $W_{filt}$ reaches the resonant optical transmission level. $W_{filt}$ is, thereby, filtered out. By tuning the intensity of $W_{inc}$, the value of the wavelength that an optical wave $W_{filt}$ coupled at $IP_2$ must meet to be filtered out, is also tuned. As a result, when driven in this way the K-IORF is a tunable filter.

However, the tuning range of the filter is limited by the refractive index difference between the ring and its surrounding media (cladding). Beyond a given difference, the propagation of both $W_{inc}$, and $W_{filt}$, in the ring is no longer single mode, which is harmful for inducing the Kerr in the K-IORF end for filtering out $W_{filt}$. Thw spectrum width of $W_{inc}$ and the range of its tunable optical power also limit the tuning range.

Nevertheless, given the short setup time of the Kerr effect (in the femto-second range), the tuning rate of such a filter is quite high. FIG. 5 summarizes the principle of the K-IORF as an all-optical tunable filter.

7. K-IORF as an All-Optical Add-and-Drop Multiplexer and as an All-Optical Space Switch.

By tuning the K-IORF as explained in the previous paragraph, the K-IORF can drop one optical wave $W_{drop}$ (see FIG. 6), the resonant wave, from a bundle of optical waves $W_{band}$ which have different optical wavelengths and which are coupled at $IP_2$. The K-IORF couples the resonant optical wave at $R\text{-}OP_2$ and the remaining optical waves at $NR\text{-}OP_2$. The K-IORF can also be tuned to add one new incident optical wave $W_{add}$, which is resonant and is coupled at the optical input port $IP_3$ ($TP_3$ also being the non-resonant optical output port $NR\text{-}OP_1$ of $W_{inc}$), to a bundle of non-resonant optical waves coupled at $IP_2$. The bundle of optical waves is coupled by the K-IORF at $NR\text{-}OP_2$ together with the new incident optical wave Wadd because $NR\text{-}OP_2$ is also the resonant optical output port $R\text{-}OP_3$ of $W_{add}$.

In this manner, the K-IORF works as an Optical Add-and-Drop Multiplexer (OADM). This assumes that the spectral spacing between the optical wavelengths of the bundle of optical waves is larger than the band-pass (FWHM of the K-IORF and that the spectrmn of the same wavelengths is smaller than the FSR of the K-IORF so as to have only one optical wave in the bundle of waves being resonant in the ring and all the remaining waves of the bundle being neither resonant nor almost resonant.

A matrix of interconnected K-IORFs driven as OADMs and integrated on the same substrate can redirect each optical wave coupled at the optical inputs of the matrix to the desired output of the outputs of the matrix. This matrix is thus an all-optical space switch.

8. The K-IORF as an All-Optical Intensity Modulator.

The K-IORF can also be used as an optical modulator (see FIG. 7). For that purpose, it must be configured and driven as described in Section 6 above. $W_{inc}$, produced by a broadband source and the power of which can be tuned, is coupled at $IP_1$. It shifts the set of values of the resonant optical wavelengths of the resonator. The optical wave to be modulated $W_{mod}$ is coupled at $IP_2$ and has a fixed wavelength $\lambda_{mod}$. The resonance shilling is adjusted so as to make $W_{mod}$ resonant. The optical intensity of $W_{mod}$ reaches the resonant optical transmission level at R-OP$_2$ while it falls to the resonance optical rejection level at NR-OP$_2$. By slightly tuning the optical power of $W_{inc}$, $W_{mod}$ becomes almost resonant and the optical intensity of $W_{mod}$ decreases at R-OP$_2$ and increases at NR-OP$_2$. To get the optical intensity to vary from the resonant optical transmission level to the resonance optical rejection level at R-OP$_2$ and from the resonant optical rejection level to the resonance optical transmission level at NR-OP$_2$, the magnitude of the resonance shift needs to be equal to the bandwidth of the K-IORF (i.e. its FWHM), which is easily achieved while maintaining single mode light propagation.

This modulation is similar to the effect achieved with a tunable edge filter. This design of optical intensity modulator can achieve fast modulation.

FIG. 8 summarizes the K-IORF as an all-optical intensity modulator.

9. Preferred and Alternative Embodiments: Release of the Constraint of the Coupler Gap.

In order to optimize the implementation of the Kerr effect in the ring of the K-IORF, the finesse F/the quality factor Q should be increased. To achieve this increase, the coupling coefficient of both the lower and the upper couplers must be accurately adjusted (typically 1% to 3%) and should be identical. This usually requires a manufacturing procedure such as Reactive Ion Etching or Reactive Ion Beam Etching, which is able to etch narrow gaps (typically in the range of several hundreds of nano-meters) between the ring and the buses. This has been demonstrated in Si (Ultra-Compact Si—SiO$_2$ Microring Resonator Optical Channel Dropping Filters, B. E. Little, J. S. Foresi, G. Steimneyer, E. R Thoen, S. T. Chu, H. A. Haus, E. P. Ippen, L. C. Kimerling, W. Greene, IEEE Photonic Technology Letters, vol. 10, n° 4, 1998, pp. 549–551) and GaAs (GaAs Microcavity Channel-Dropping Filter Based on a Race-Track Resonator, M. K. Chin, C; Youtzey, W; Zhao, T. Pierson, Z. Ren, S. L. Wu, L. Wang, Y. G. Zhao, S. T. Ho, IEEE Photonic Technology Letters, vol. 11, n° 12, 1999, pp. 1620–1622), but may still be rather difficult to achieve with a satisfactory yield. Three design alternatives capable of reducing the stringent requirement regarding the gap of the couplers are discussed below.

I. Longer Interaction Length of the Couplers.

As stated earlier, the preferred materials for the K-IORF are materials that allow for strong wave guidance in the buses and the ring. By utilizing such preferred materials, the coupling of light between the adjacent waveg ides of the K-IORF through the evanescent field is quite weak and, therefore, is consistent with the required small value of the coupling coefficient. However, if the gap of each coupler cannot be manufactured as small as required to achieve the desired coupling coefficient, the length of interaction between each bus and the ring (the "coupling length") should be increased. If the coupling length has to remain short while the gap cannot be manufactured as small as required, a so-called vertical coupling configuration can be implemented. These alternatives are discussed below.

Two alternative configurations can be used to increase the coupling length:

1. In the vicinity of the circular ring, the buses are arcs centered at the center of the ring and having a bending radius slightly larger than the ring (FIG. 9) (FDTD Microcavity Simulations: Design and Experimental Realization of Waveguide-Coupled Single-Mode Ring and Whispering-Gallery-Mode Disk resonators, S. C. Hagness, D. Rafizadeh, S. T. Ho, A. Taflove, Journal of Lightwave Technology, vol. 15, n° 11, 1997, pp. 2154–2165); or 2. The ring of the K-IORF is not designed as a perfect circle, but rather an oval with two straight segments alongside the buses which are straight waveguides along these segments (FIG. 10). This configuration is also known as the race-track resonator. (GaAs Microcavity Channel-Dropping Filter Based on a Race-Track Resonator, M. K. Chin, C; Youtzey, W; Zhao, T. Pierson, Z. Ren, S. L. Wu, L. Wang, Y. G. Zhao, S. T. Ho, IEEE Photonic Technology Letters, vol. 11, n° 12, 1999, pp. 1620–1622)

In these two alternative configurations, the wider coupler gap reduces the amount of light coupled per unit length from the bus to the ring and from the ring to the bus. However, the longer length of interaction between the waveguides increases the amount of light coupled and, thereby, compensates for the weaker coupling amount per unit length ("coupling rate"). The total coupling rate or actual coupling coefficient can be set to its required value by etching a wider coupler gap. A wider gap is easier to achieve than a sub-micron gap and allows for a better manufacturing yield. Moreover, the manufacturing repeatability of the coupler is improved and the two couplers of the K-IORF have a greater chance of being identical.

II. Vertically Coupled Ring Resonator.

A third alternative to the basic configuration of the K-IORF shown in FIG. 1 is the vertical coupler K-IORF (FIG. 11). The buses are embedded waveguides (straight or curved), which means that they are buried in the substrate supporting the ring and their top boundary is very close to the surface of the substrate. The material of the ring is deposited onto the substrate containing the buses and the ring is then etched in this top layer.

The buses and the ring have the same refractive index. The substrate has a refractive index close to the refractive index of the ring/buses. The ring etched on top of the substrate, however, is surrounded by a media that has a refractive index very different from the refractive index of the ring (typically, air) on its top and at its lateral sides (outer wall and inner wall of the ring). This configuration results in:

a weak confinement of light in the buses and at the bottom boundary of the ring causing the evanescent tail of light propagating in the buses to penetrate deeper in the substrate; and a strong confinement of light in the ring in the horizontal direction (direction of the bending radius of the ring)

and at the top boundary of the ring causing the bottom evanescent tail of light propagating in the ring to penetrate deeper in the substrate while the top evanescent and the lateral evanescent tails do not penetrate deeper in their surrounding medium.

Because the evanescent tails of light propagating in the buses and in the ring penetrate deeper in the substrate, the overlap of each of these tails on the opposite waveguide is larger and the coupling rate is, therefore, larger along a short interaction length. In addition, the gap is no longer a matter of etching technique, but a matter of substrate layer deposition, which is a more controlled process inducing less damage in the structure.

While this third alternative design is quite attractive, the manufacturing process is a little more complicated than with the basic design (FIG. 1) and the total confinement of light is slightly smaller. A smaller confinement of light means a weaker Kerr effect and, therefore, the vertical coupler K-IORF would require slightly more optical power to induce the resonance shift of the resonator since the Kerr threshold in the ring is increased. Nevertheless, the advantage of this design regarding the manufacturing tolerance is very interesting.

10. Conclusion

The implementation of the Kerr effect in an integrated optical ring filter is the core technology of a series of all-optical devices where an optical wave interacts with matter to modulate another optical wave without the need for any light conversion of any kind. This technology yields, among other devices, high scan rate optical tunable filters, high frequency optical modulators, high-speed optical wavelength converters (wavelength switch), fast tunable optical add-and-drop multiplexers. These devices can be integrated on the same optical chip allowing for multi-functional optical integrated circuits combining several technical features. While multi-functional optical integrated circuits find their utility and need in several industries, they are particularly relevant to the needs of optical telecommunication networks.

Large-scale integration and low power consumption can be achieved through the selection of the substrate used in the integrated circuit. Depending on the substrate in which the devices are integrated, the level of integration can be on a larger or smaller scale. High refractive index contrast wavegnides (e.g. GaAs, GahiAsP), for example, allow for large-scale integration of optical circuits. In addition, while certain substrates exhibit a weak Kerr strength (e.g. $SiO_2$), others exhibit a strong Kerr strength (e.g. GaInAsP). With a stronger Kerr strength, less optical power is required to trigger the Kerr effect and the power consumption of the device is decreased.

Therefore, with the selection of appropriate substrates, a compromise can be found between the level of integration (high or low refractive index contrast), the manufacturing yield (e.g. higher yield with proven Si technology, lower yield with currently less developed IP technology), the power consumption (defined by the Kerr strength), with each of these characteristics being able to compensate for another. This flexibility in design brings to the developer and manufacturer of the K-IORF, several alternatives to adapt the technology and to optimize the cost of the K-IORF to competitively target different markets.

I claim:

1. A method of shifting the resonance curves of an optical ring filter using the Kerr effect comprising the steps of:

Coupling an incident optical wave ("$W_{inc}$") to one of the optical bus waveguides (the "buses") of an optical ring filter comprising two buses coupled to a ring waveguide resonator (the "ring");

Setting the value of the wavelength $\lambda_{mc}$ of $W_{inc}$ to one of the resonant wavelength values of the ring resulting in $W_{mc}$ propagating through the ring to the other bus;

Increasing the optical intensity of $W_{mc}$, causing a shift in the refractive index value of the ring due to the Kerr effect, up to a working point where the resonant intensity of $W_{inc}$ remains large enough to maintain the shift of the value of the refractive index of the ring;

Resulting in a shift of the resonance curves of the ring, which are also the resonance curves of the optical ring filter.

2. A method of achieving All-Optical Wavelength Switching with an optical ring filter using the Kerr effect as claimed in claim 1 and comprising the steps of:

Coupling a new optical wave ("$W_{new}$") with continuous optical intensity into the optical ring filter and setting the value of its wavelength $\lambda_{new}$ to one of the resonant wavelength values of the ring;

Coupling $W_{new}$ into one of the buses such that $W_{new}$ and the incident optical wave $W_{inc}$ are counter-propagating in the ring;

Modulating the optical intensity of $W_{inc}$ and increasing its average optical intensity so as to induce the Kerr effect and a shift of the resonance curves of the ring;

Varying the shift of the resonance curves by modulating the optical intensity of $W_{inc}$ according to the modulation pattern of $W_{inc}$, thereby causing a change to the resonance of $W_{new}$ in the ring and, therefore, to the optical intensity of $W_{new}$ at the output port of the bus where $W_{new}$ was initially coupled such that the modulation of the intensity of $W_{new}$ at this port matches the modulation pattern of $W_{inc}$ resulting in an all-optical transfer of the intensity modulation pattern of $W_{inc}$ to $W_{new}$;

Selecting $\lambda_{new}$ different from $\lambda_{inc}$ thereby achieving all-optical wavelength conversion also known as all-optical wavelength switching.

3. A method of achieving All-Optical Wavelength Tuning with an optical ring filter using the Kerr effect as claimed in claim 1 and comprising the steps of:

Using a broadband source to produce an incident optical wave $W_{inc}$, which has a subset of its spectral components matching the band-pass of the ring and therefore being resonant, with the subset being determined by the optical intensity of $W_{inc}$ due to the Kerr effect;

Coupling $W_{inc}$ to one of the buses of the ring and coupling the optical wave to be filtered out by the optical ring filter ("$W_{filt}$") to one of the buses of the ring such that $W_{filt}$ and $W_{inc}$ are counter-propagating in the ring;

Increasing or decreasing the optical intensity of $W_{inc}$ so as to shift respectively forward or backward the resonance curves of the ring thereby tuning the optical wavelength that $W_{filt}$ must have to be resonant in the ring and to be filtered out by the optical ring filter from one bus to the other bus.

4. A method of achieving All-Optical Wavelength Dropping with an optical ring filter using the Kerr effect as claimed in claim 3 and comprising the steps of:

Coupling a bundle of optical waves ("$W_{band}$") to one of the buses where $W_{inc}$ is not initially coupled and in such a way that $W_{band}$ and $W_{inc}$ are counter-propagating in the ring;

Selecting a spectrum of wavelengths of $W_{band}$ that is smaller than the free spectral range of the ring;

Tuning the wavelength to be filtered out by the optical ring filter by increasing or decreasing the optical intensity of $W_{inc}$;

Matching the wavelength of $W_{filt}$ to the optical wavelength of the optical wave in the bundle that is desired to be dropped ("$W_{drop}$"), thereby causing $W_{drop}$ to be resonant in the ring and coupled from one bus to the opposite bus through the ring while the remaining waves of $W_{band}$ are coupled at the output port of their initial bus resulting in the dropping of the desired optical wave from the bundle of optical waves.

5. A method of achieving All-Optical Wavelength Adding with an optical ring filter using the Kerr effect as claimed in claim 4 and comprising the steps of:

Coupling an optical wave desired to be added ("$W_{add}$") to $W_{band}$ to the bus where $W_{inc}$ is initially coupled and in such a way that $W_{add}$ and $W_{inc}$ are counter-propagating in the ring;

Selecting the optical wavelength $\lambda_{add}$ of $W_{add}$ that is different from each optical wavelength of the optical waves of $W_{band}$;

Increasing or decreasing the optical intensity of $W_{inc}$ so as to tune the wavelength filtered out by the optical ring filter to match it to the wavelength $\lambda_{add}$, thereby causing $W_{add}$ to be resonant in the ring and coupled from its initial bus to the bus where $W_{add}$ is coupled resulting in the addition of $W_{add}$ to $W_{band}$ at the output port of this bus.

6. A method of achieving All-Optical Space Switching using All-Optical Add-and-Drop Multiplexers as claimed in claim 5 and comprising the steps of:

Interconnecting several All-Optical Add-and-Drop Multiplexers in a matrix;

Coupling at each input of the N optical inputs of the matrix a bundle of optical waves;

Adding, dropping or passing each wave of the bundle of optical waves through the add-and-drop multiplexers and coupling said waves to one chosen optical output of the M optical outputs of the matrix achieving, thereby, All-Optical Space Switching.

7. A method of achieving All-Optical Intensity Modulation with an optical ring filter using the Kerr effect as claimed in claim 3 and comprising the steps of:

Coupling the optical wave to be modulated ("$W_{mod}$") to one of the buses such that $W_{mod}$ and $W_{inc}$ are counter-propagating in the ring;

Tuning the wavelength to be filtered out by the optical ring filter to a point where it matches the optical wavelength $\lambda_{mod}$ of $W_{mod}$;

Increasing or decreasing the optical intensity of $W_{inc}$ around said point so as to tune the resonance curves over the band-pass of the ring resonator, thereby causing $W_{mod}$ to be more or less resonant and causing part of its intensity to be coupled at the output port of its initial bus resulting in All-Optical Intensity Modulation.

* * * * *